O. C. HOUGHTON.
MACHINE FOR REMOVING LEAVES AND TRASH FROM SEED COTTON.
APPLICATION FILED MAR. 6, 1911.
1,039,402.
Patented Sept. 24, 1912.
4 SHEETS—SHEET 3.
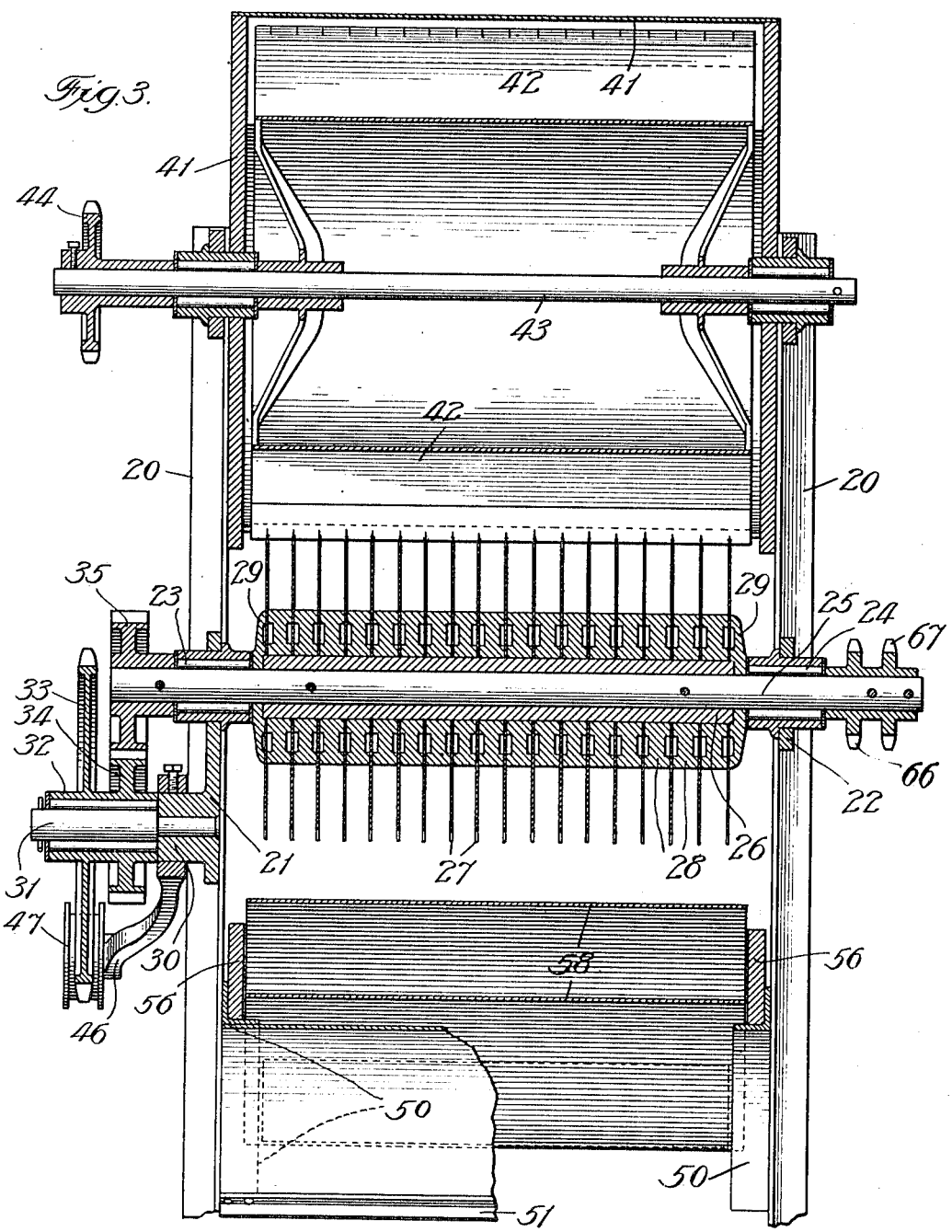

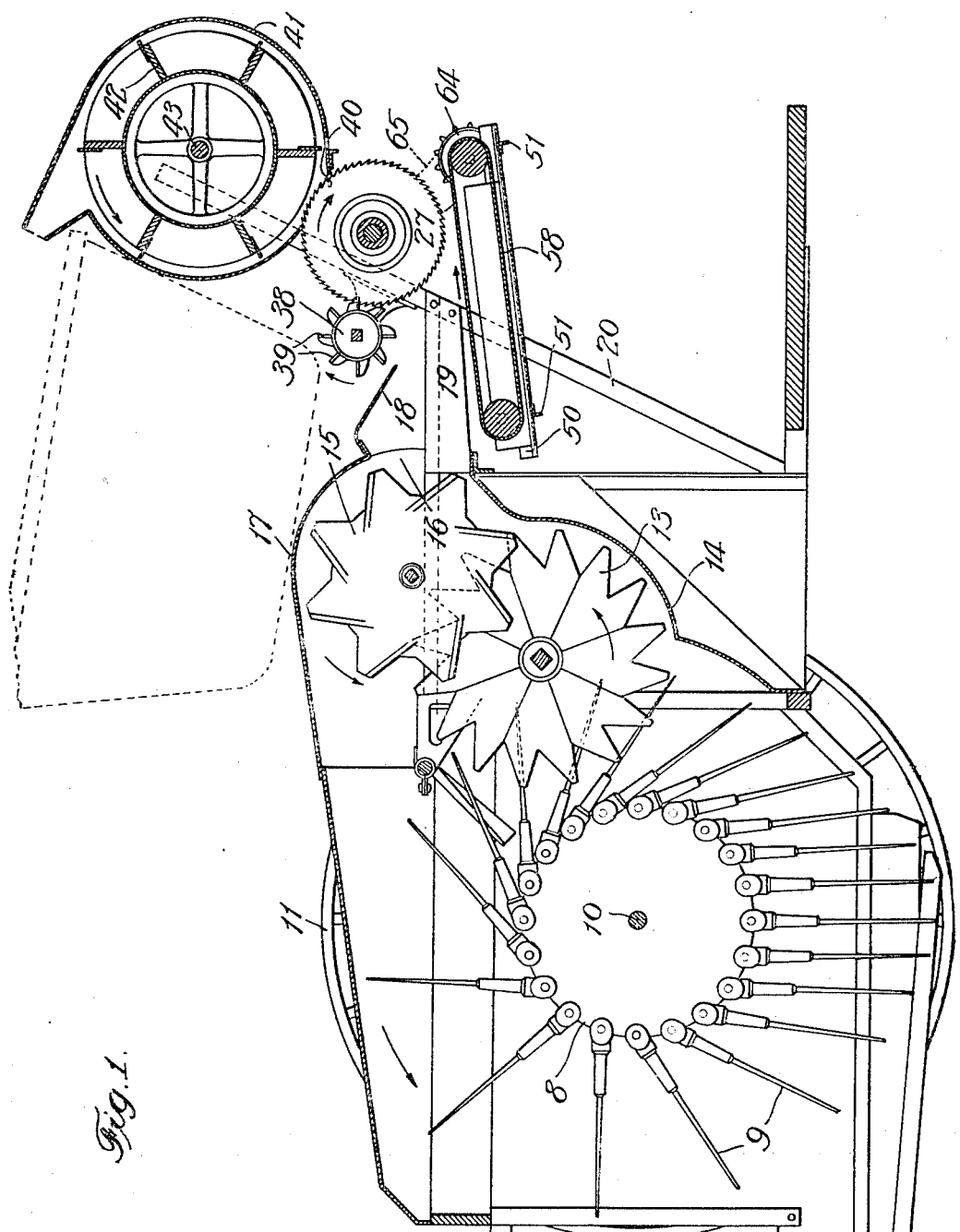

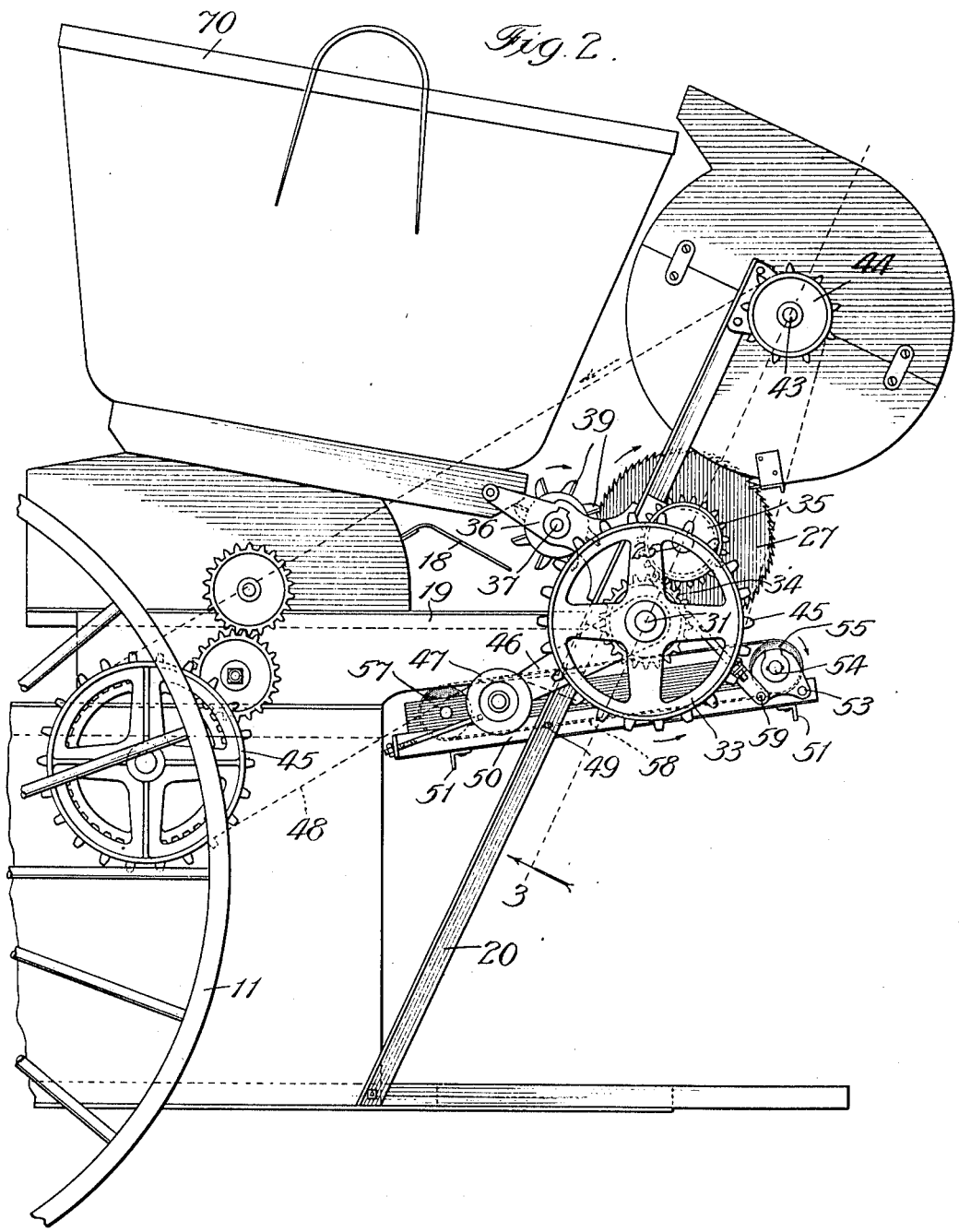

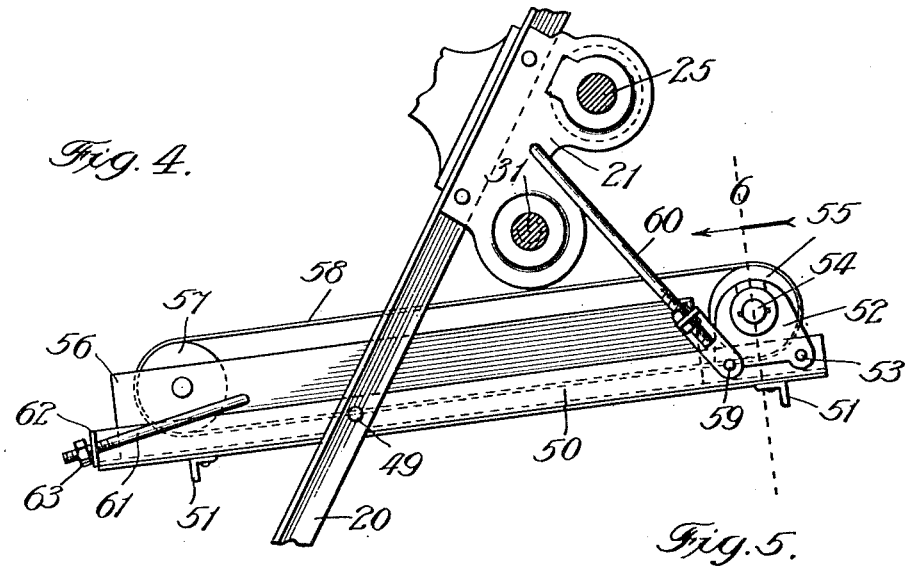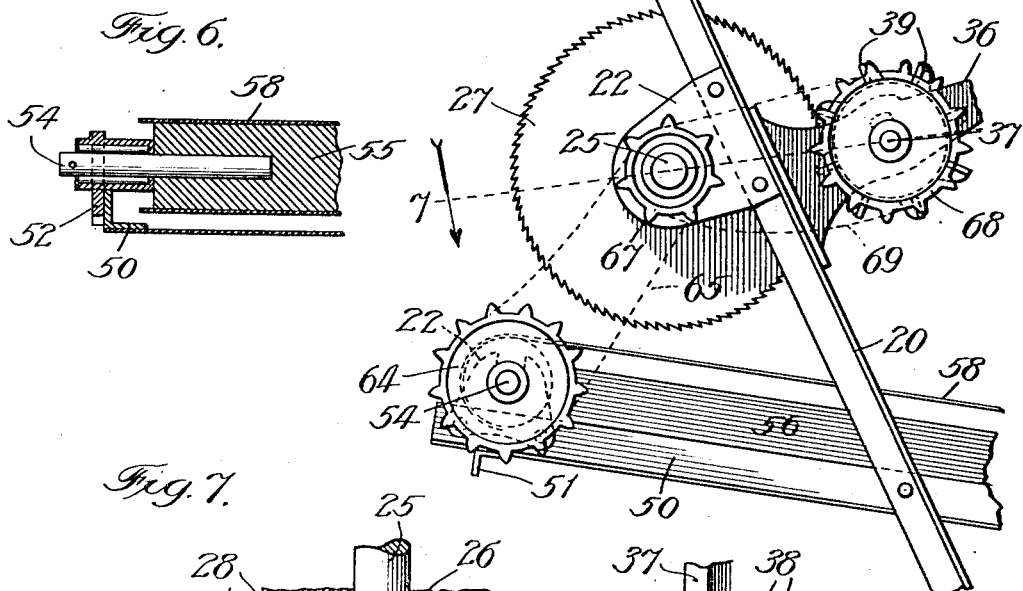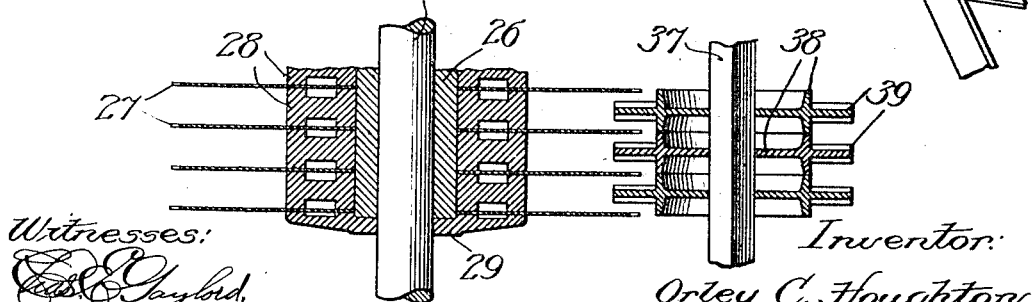

UNITED STATES PATENT OFFICE.

ORLEY C. HOUGHTON, OF CHICAGO, ILLINOIS, ASSIGNOR TO H. E. AND J. E. BULLOCK, OF CHICAGO, ILLINOIS.

MACHINE FOR REMOVING LEAVES AND TRASH FROM SEED-COTTON.

1,039,402.  Specification of Letters Patent.  Patented Sept. 24, 1912.

Application filed March 6, 1911. Serial No. 612,638.

*To all whom it may concern:*

Be it known that I, ORLEY C. HOUGHTON, a citizen of the United States, residing at Chicago, in the county of Cook and State of Illinois, have invented a new and useful Improvement in Machines for Removing Leaves and Trash from Seed-Cotton, of which the following is a specification.

This invention relates to improvement in cotton-cleaning mechanism; my object being to provide such mechanism of simple and improved construction, and, which may be employed as an adjunct applicable to cotton-picking machines for separating from the cotton, and discarding, any green leaves and other trash gathered from the plants in the picking operation.

While my improvements may be adapted and applied to cotton picking harvesters of any type, I show them, in the present connection, upon a machine of the well-known construction, wherein the adjacent series of picker-spindles extend and revolve in parallel vertical planes, and the cotton is removed from the spindles by suitable stripping mechanism.

In the accompanying drawings—Figure 1 is a vertical section taken longitudinally through the end-portion of the cotton picker and showing only such details of construction as are considered necessary for a clear understanding of the present invention; Fig. 2, an enlarged broken side elevation of the rear end-portion of the machine; Fig. 3, a further enlarged section on the inclined line 3 in Fig. 2; Fig. 4, a broken and partly sectional view showing the trash-discarding conveyer in side elevation; Fig. 5, an enlarged fragmentary elevation of the side of the machine opposite that shown in Fig. 2; Fig. 6, a broken section taken on line 6 in Fig. 4; and Fig. 7, an enlarged broken section taken on line 7 in Fig. 5.

The horizontal drum 8 equipped with the parallel vertical series of picker-spindles 9, surrounds the main shaft 10 which is driven indirectly from the driving-wheels 11. The spindles are driven, as usual, by the rotation of the drum in the advance of the machine, to gather cotton from the plants over which they move, the speed of relative backward travel of the spindles, while in the plants, approximating that of the forward travel of the machine. As the spindles are withdrawn from the plants the gathered cotton is stripped therefrom by a series of parallel rotating stripper-disks 13 which intermesh with the series of spindles. The stripper-disks engage the cotton on the spindles and transfer it to and elevate it along the casing-wall 14. Intermeshing with the disks 13 are rotating serrated discharging disks 15 which engage the cotton as it is moved thereto and discharge it through the opening 16 in the casing 17 against the downwardly-deflecting baffle-plate 18 forming an extension of the casing.

The price which raw, baled cotton commands in the market depends to a large extent upon its freedom from leaves, twigs, etc. It is usual, therefore, after cotton has been picked, or harvested, to pass it through a cotton cleaning machine which operates to eliminate, to a more or less extent, the trash which has been gathered with the cotton in the picking or harvesting operation. The cotton as gathered is deposited in baskets, or the like receptacles, and packed down so that the receptacle may hold a good quantity; and the cotton cleaning machines are equipped at their receiving ends, generally, with rotary beaters which open up the cotton so that the cleaning mechanism may act more readily thereon. These beaters crush any unopened bolls, that may have been gathered, to free the cotton contained therein, and also tend to break up twigs and dry leaves or shred any green leaves that may be present. While the breaking up of twigs and dry trash may facilitate their removal by the cleaning mechanism it has hitherto been impossible to eliminate, with any degree of thoroughness, the green leaves present, and the very act of breaking or shredding them causes them to discolor the cotton and also makes their removal therefrom more difficult, thus depreciating the market value of the cotton.

It is one of the principal purposes of my invention to provide mechanism which will operate to effectively eliminate any green leaves that are unavoidably gathered with the cotton from standing plants without breaking them up, and thus avoid the depreciation of the value of the cotton due to the discoloring action of such leaves and their presence in the cotton.

Forming part of the frame of the machine at opposite sides of the opening 16 are backwardly-extending arms or brackets 19 supporting the inclined angle-bar posts 20. Secured to the post 20 shown in Figs. 2 and 4 is a bearing-plate 21, and on the opposite post 20 (see Fig. 5) is a bearing-plate 22. The plates 21, 22, carry coincident roller-bearing boxes 23, 24, for a shaft 25. Pinned or otherwise secured to the shaft 25 is a sleeve 26 on which is mounted a series of parallel pick-ups or disks 27 having serrated peripheries and spaced apart by spacer-collars 28 on the sleeve 26. The disks 27 and spacer-collars 28 are clamped in position by the end-clamping plates 29. Mounted on a bearing-boss 30 on the plate 21 is a stub-shaft 31 on which is journaled a sleeve 32 forming the hub of a sprocket-wheel 33 and pinion 34. The pinion 34 engages a pinion 35 on the shaft 25. The posts 20 carry companion arms or brackets 36 forming bearings for a shaft 37 carrying a series of beater-wheels 38 each formed with peripheral blades or fingers 39 intermeshing with the peripheral portions of the pick-up disks 27. The pick-up disks 27 rotate at their peripheries in the suction-opening 40 of a fan-blower casing 41, the fan-wheel 42 of which is mounted upon a shaft 43 journaled in the casing 41 and carrying a sprocket-wheel 44. The fan-blower is mounted between the upper ends of the posts 20.

The shaft carrying the stripper-disks 13 is driven in the usual way from the main shaft 10, and carries a sprocket-wheel 45.

Mounted on the boss 30 is an arm 46 carrying a chain-tensioning roller 47; and extending around the sprocket-wheels 45, 33, 44, and tensioning-roller 47 is a drive-chain 48, moving in the direction indicated by the arrow in Fig. 2.

Pivotally mounted at the points 49 on the posts 20 is a conveyer-frame consisting of side angle-bars 50 joined together by cross-bars 51. On the side-bars 50 are companion bearing-plates 52 for the journals 54 of a roller 55. Slidably mounted upon the angle-bars 50 are longitudinally-extending cheek-plates 56 forming bearings for a roller 57. Extending around the rollers 55, 57, is a conveyer-belt 58. The conveyer-frame is connected at 59 with extensible rods 60 hanging from the plates or brackets 21; and pivotally connected with the cheek-plates 56 are threaded-rods 61 passing through openings in bearing-flanges 62 on the conveyer-frame and tightened by means of nuts 63. The conveyer-frame may be adjusted to different angles on its pivots 49 by lengthening and shortening the rods 60, and the conveyer-belt 58 may be tightened or loosened by turning the nuts 63. The roller 55 carries a sprocket-wheel 64 driven by a chain 65 from a sprocket-wheel 66 on the shaft 25 and said shaft carries a sprocket-wheel 67 which drives a sprocket-wheel 68 on the shaft 37 through a chain 69.

In operation the gathered cotton discharged through the opening 16 against the baffle-plate 18 is deflected onto the conveyer-belt 58 and moved in the backward direction. The upper stretch of the conveyer-belt is, in practice, an inch more or less below the pick-ups or disks 27, whereby, as the cotton is moved toward the discharge end of the conveyer-belt, it is picked up by the disks 27. After being thus picked up the cotton is operated upon by the beater-wheels 38, intermeshing with the disks 27, which comb out of the cotton any leaves and other trash causing them to fall upon the conveyer-belt and be carried over its discharge end. After passing the beater-wheels the cotton is moved to the suction-opening of the fan-blower 41 which operates to withdraw the cotton from the pick-up disks 27 and discharge it into a basket 70 placed upon the machine. The conveyer-frame should be adjusted by means of its rods to cause the belt to travel sufficiently close to the pick-up wheels to prevent any of the cotton from being lost, while permitting the leaves and trash to be discharged. The cotton when stripped from the spindles 9 is in an unpacked or fluffy state, and reaches the conveyer in small, open and more or less separate bunches, thus avoiding the massing of the cotton and obviating the necessity of opening it up with beaters, or the like, which of necessity break up or shred the green leaves. As the cotton in this loose condition is picked up by the disks or saws 27 and moved across the revolving fingers 39, the latter operate to comb out the trash without breaking up or shredding the green leaves, and the leaves being left intact are easily freed from the cotton, thrown back upon the traveling belt 58 and discharged over the end of the same. As the gathered bunches of cotton are deposited upon the belt they are acted upon by the cleaning mechanism, and the trash carried by one bunch will, for the most part, at least, be combed out and moved out of the way before the next directly following gathered bunch is picked up by the saws.

The foregoing description of my improved cotton-cleaning mechanism as I now prefer to provide it, has been given for clearness of understanding only, my intention being that no undue limitation should be understood therefrom, and that the claims which follow shall be construed as broadly as the prior state of the art may permit.

What I claim as new, and desire to secure by Letters Patent is:

1. A machine of the character described, comprising means for gathering cotton in separate loose bunches from the standing plants, a traveling conveyer on which the bunches are deposited as gathered, a series of cotton engaging pick-ups extending over the conveyer, means for combing trash from the cotton raised by the pick-ups, and means for removing the cleaned cotton from the pick-ups, whereby green leaves gathered with the cotton are unbroken and eliminated therefrom.

2. A cleaner for seed cotton, including a frame structure constructed to receive the cleaning mechanism, said cleaning mechanism comprising a traveling conveyer on which the cotton to be cleaned is deposited, a series of rotating spaced cotton-engaging pick-ups located above said conveyer in spaced relation thereto, said conveyer extending beyond the lowermost peripheral margins of said pick-ups, a rotating separator located above said conveyer comprising members having fingers constructed to enter the peripheral spaces between the pick-ups, a pneumatic apparatus located above said pick-ups, and a receptacle constructed to receive the cleaned cotton, said pneumatic apparatus being constructed to detach the cleaned cotton from said pick-ups and to conduct said cotton to said receptacle.

ORLEY C. HOUGHTON.

In presence of—
R. A. RAYMOND,
J. G. ANDERSON.